United States Patent [19]
Daniels

[11] 3,841,168
[45] Oct. 15, 1974

[54] TEMPORARY REPLACEMENT DRIVE BELT FOR AUTOMOTIVE VEHICLES

[75] Inventor: Donald H. Daniels, Phoenix, Ariz.

[73] Assignee: Roger Demchak, Cambria, Calif. ; a part interest

[22] Filed: Sept. 18, 1973

[21] Appl. No.: 398,562

[52] U.S. Cl. ............................................. 74/231 J
[51] Int. Cl. ............................................... F16g 1/00
[58] Field of Search ................................... 74/231 J

[56] References Cited
UNITED STATES PATENTS
3,788,156   1/1974   Jackson............................ 74/231 J Primary Examiner—Leonard H. Gerin
Attorney, Agent, or Firm—Charles E. Cates

[57] ABSTRACT

A readily installed drive belt for cars in which a flexible and elastically extensible belt having top and bottom grooves and a communicating hole in each end is disclosed. A coupler which resides wholly within the grooves and holes is provided.

5 Claims, 5 Drawing Figures

PATENTED OCT 15 1974  3,841,168

TEMPORARY REPLACEMENT DRIVE BELT FOR AUTOMOTIVE VEHICLES

BACKGROUND OF THE INVENTION

This invention relates to a temporary replacement drive belt for automotive vehicles which can be readily installed by the vehicle owner or operator.

As the automobile continues to include more accessories driven from the front terminus of the driveshaft, the number of drive belts or so-called fan belts therein has increased. It is not unusual to find three drive belts in a particular automobile. As a result, the probability of the operator of an automobile experiencing the loss due to breakage of a drive belt during vehicle operation is greatly increased. Breakage normally occurs without warning or if in fact a visual inspection of the belt would constitute a warning, the normal owner or operator does not regularly inspect the drive belts. Consequently, the operator of the automotive vehicle learns of breakage after the fact due to a malfunction of the vehicle such as overheating, loss of power steering, loss of airconditioning or the like.

The unexpected loss of a drive belt most often takes place away from a service station or other place where repairs can be made by skilled mechanics according to the manufacturer's specification. Accordingly, the need for a temporary replacement drive belt which is capable of being installed on differingly spaced drive and driven wheel combinations without the use of special tools or skills is substantial.

SUMMARY OF THE INVENTION

The present invention constitutes a versatile temporary replacement drive belt for automotive vehicles and the like which is readily installed by an unskilled person without requiring special tools.

The invention includes, a flexible and elastically extensible, drive belt having first and second opposing surfaces which are adapted to engage the drive wheel and the driven wheel. In each of these belt surfaces, a groove is formed. A hole or communicating channel is located proximate to each end of the extensible belt. The hole extends between the bottom surfaces of the grooves in the opposing surfaces of the belt.

A coupling means for securing the ends of the belt in adjacent position is provided. When a drive belt in the vehicle has failed, the elastically extensible replacement is drawn over the drive and driven wheels and its ends are adjacently secured by the coupling means. The coupling means, when in position, resides entirely within the grooves and the communicating channels or holes therebetween so as not to provide a point of contact with either the drive or driven wheels thus essentially eliminating any possibility of damage thereto.

Further features and advantages of the invention will become more readily apparent from the following detailed description of specific embodiments of the invention when taken in conjunction with the accompanying drawings.

DESCRIPTION OF THE PREFERRED EMBODIMENTS

Figure 1:
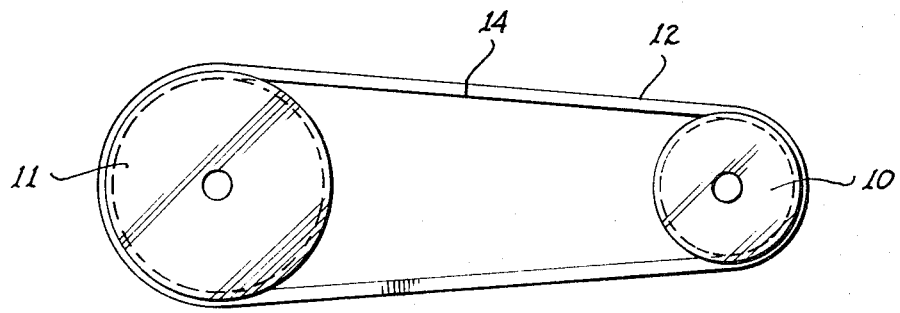
FIG. 1 is a view showing the present invention connected between a pair of drive and driven wheels.

Referring now to FIG. 1, drive wheel 10 is shown coupled to driven wheel 11 by means of drive belt 12. The guideways upon the periphery of wheels 10 and 11 are shown by the dotted lines of FIG. 1.

The belt 12 is flexible so that the drive and driven wheels need not be located in the same plane. In addition, the belt 12 is expressly made elastically extensible so that it may be utilized on wheels having different axial spacings and also so that the belt may be readily placed into position without requiring the use of special tools. In practice, the belt is made of elastic or stretch rubber. However, synthetic elastic materials may be utilized if desired.

Figure 2:
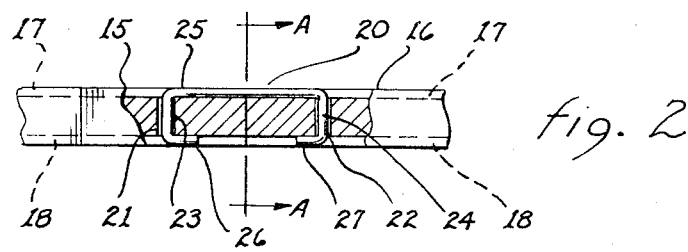
FIG. 2 is an enlarged view in partial section of the juncture between the ends of the belt.
Figure 3:
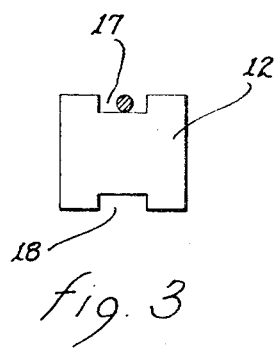
FIG. 3 is a cross-sectional view of one embodiment of the invention taken along line A—A of FIG. 2.

The belt ends are joined at juncture 14 in FIG. 1. This juncture is shown in the expanded cross-sectional view of FIG. 2 and is formed by the free ends 15 and 16 of belt 12. The top and bottom surfaces of the belt each contain a groove or channel. The grooves preferably extend throughout the length of the belt. However for the purposes of effecting the juncture 14 it is only necessary that the grooves extend along the portions of the belt adjacent the free ends thereof. The cross-section of the belt at the juncture is shown in FIG. 3.

The coupling means 20 maintains the free ends of belt 12 in an adjacent or close-spaced relationship. Since the belt is to be installed and the juncture made by the vehicle operator often at a location remote from a service station, the coupling means is made so that it can be readily installed by hand in the elastic belt. In addition, both of the belt ends 15, 16 contain a hole or channel 21, 22 extending between grooves 17 and 18 for receiving a portion of coupling means 20. It shall be noted from FIGS. 2 and 3 that when placed in position to form juncture 14, no portion of the coupling means 20 extends beyond or without the major dimensions of the belt. Consequently, the drive and driven wheels experience a smooth surface during operation regardless of how the belt or coupling means is oriented after installation.

The holes 21 and 22 are spaced from the free ends of the belt by a total distance approximately as great as the distance between shank portions 23 and 24 of the coupling means. The shank portions are made to have a length approximately equal to the length of the holes so that neither the base member 25 nor the inwardly extending ends 26 and 27 depending from the shank portions protrude beyond the surface of the belt. The coupling means 20 is shown circular in cross-section since this has been found to facilitate rapid installation. However, other configurations may be utilized.

Installation of the temporary replacement belt is accomplished by inserting one end of the coupling means in a free end of the belt, stretching the belt so that the ends are adjacent and then inserting the other end of the coupling means in the remaining end of the belt. Since the coupling means is accommodated by the holes and grooves in the belt, the belt and coupling means may be utilized in any manner thus facilitating installation, increasing the number of applications and insuring that the unskilled installer neither damages a wheel nor is required to unfasten and reinstall the belt.

Figure 4:
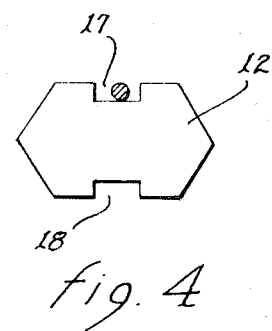
FIG. 4 is a cross-sectional view of a second embodiment of the invention taken along line A—A of FIG. 2.

The embodiment shown in FIG. 3 is straight-sided. By extending the top and bottom grooves along the entire length of the elastic belt, the sides of the belt have a tendency to conform to the guideways of the drive and driven wheels. This increases the common areas and reduces slippage. A further embodiment of the invention is shown in FIG. 4 wherein the belt 12 is outwardly tapered in cross-section from its central portion to facilitate engagement of the belt with the drive and driven wheels. Due to the symmetry about its central portion, this embodiment can be installed in the same manner as the embodiment of FIG. 3.

Figure 5:
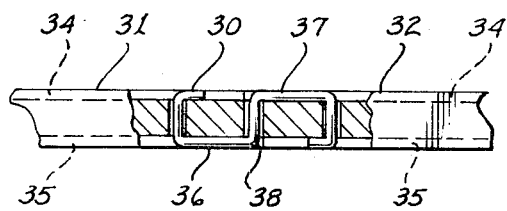
FIG. 5 is an enlarged view in partial section of the juncture between the ends of the belt for yet another embodiment of the invention.

Another embodiment of the invention is shown in FIG. 5 and includes a generally S-shaped coupling means 30 connected to free ends 31, 32 of the elastically extendible belt. The belt has grooves 34 and 35 on the opposing surfaces thereof to fully accommodate the first and second base members 36 and 37 as well as the inwardly extending ends of the coupling means. The central portion 38 of the coupling means 30 extends between the free ends of the belt and consequently is prevented from contacting the guideways of the drive and driven wheels.

It is to be understood that examples of the use of my temporary replacement drive belt on automotive vehicles is intended to be illustrative only. It may also be employed for analogous uses such as, by way of example and not as a limitation, a temporary replacement for the drive belts on blowers and fans used for cooling, heating and ventilation in the home, where the function of the machinery is not desired to be interrupted, even temporarily. Other equivalent uses and modifications will occur to those skilled in the art and such equivalents are not intended to be limited by the examples but are to be governed by the scope of the claims appended hereto.

What is claimed is:

1. A replacement drive belt for installation between a drive wheel and a driven wheel which comprises:
   a. an elastically extensible belt having first and second opposing surfaces adapted to engage the drive wheel and the driven wheel; said belt having first and second ends;
   b. first and second grooves formed in said first and second opposing surfaces respectively at least adjacent said first and second ends thereof;
   c. first and second holes formed in said first and second ends respectively, said holes extending between the first and second grooves formed in said belt, and
   d. coupling means for securing the ends of said belt in adjacent position, said coupling means extending through said first and second holes and engaging the first and second grooves in the opposing surfaces of said belt whereby said coupling means resides within said grooves and holes.

2. The replacement drive belt of claim 1 wherein said first and second grooves extend along the length of said belt.

3. The replacement drive belt of claim 1 wherein said coupling means comprises:
   a. a base connecting member adapted to be received by said grooves;
   b. first and second shank portions depending substantially perpendicularly from said base connecting member, said shank portions residing within said first and second holes respectively, and
   c. first and second inwardly extending end portions depending substantially perpendicularly from the first and second shank portions respectively, said end portions adapted to be received by said grooves.

4. The replacement drive belt of claim 1 wherein said coupling means comprises:
   a. first and second base members adapted to be received by said first and second grooves respectively;
   b. a central link connecting said base members;
   c. first and second shank portions depending substantially perpendicularly from said first and second base members respectively, said shank portions residing within said first and second holes respectively, and
   d. first and second inwardly extending end portions depending substantially perpendicularly from the first and second shank portions respectively, said end portions adapted to be received by said grooves.

5. The replacement drive belt of claim 1 wherein said elastically extensible belt is outwardly tapered in cross-section from its central portion whereby said first and second surfaces are each adapted to engage the drive and driven wheels.

* * * * *